United States Patent
Lindoff et al.

(10) Patent No.: US 8,644,403 B2
(45) Date of Patent: Feb. 4, 2014

(54) OPERATION OF USER EQUIPMENT WHEN CONTROL AND DATA INFORMATION ARE SUPPLIED BY DIFFERENT RADIO UNITS

(75) Inventors: Bengt Lindoff, Bjarred (SE); Fredrik Nordstrom, Lund (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 316 days.

(21) Appl. No.: 13/036,523

(22) Filed: Feb. 28, 2011

(65) Prior Publication Data

US 2012/0219041 A1 Aug. 30, 2012

(51) Int. Cl.
*H04K 1/10* (2006.01)
(52) U.S. Cl.
USPC ............. 375/260; 340/3.2; 370/464; 341/180
(58) Field of Classification Search
None
See application file for complete search history.

(56) References Cited

U.S. PATENT DOCUMENTS

2010/0142461 A1* 6/2010 Miki et al. .................... 370/329
2011/0170438 A1* 7/2011 Kishiyama et al. ........... 370/252

FOREIGN PATENT DOCUMENTS

| EP | 1 598 970 A1 | 11/2005 |
| EP | 1 976 148 A1 | 10/2008 |
| WO | 2010/076854 A1 | 7/2010 |

OTHER PUBLICATIONS

PCT International Search Report, mailed Jun. 4, 2012, in connection with International Application No. PCT/EP2012/053105.
PCT Written Opinion, mailed Jun. 4, 2012, in connection with International Application No. PCT/EP2012/053105.
International Preliminary Report on Patentability, mailed Jan. 29, 2013, in connection with International Application No. PCT/EP2012/053105.

* cited by examiner

*Primary Examiner* — Adolf Dsouza
(74) *Attorney, Agent, or Firm* — Potomac Patent Group PLLC; Kenneth B. Leffler

(57) ABSTRACT

An Orthogonal Frequency Division Multiplexing (OFDM) symbol for transmission from a non-reference transceiver to a user equipment (UE) in a mobile communication system is generated by ascertaining a general timing for transmission of OFDM symbols, in which the general timing is associated with a reference transceiver. A UE timing relative to the general timing is ascertained. An initial resource element (RE) value is adjusted by a pre-compensating amount to obtain a pre-compensated RE value, in which the pre-compensating amount is based on the UE timing relative to the general timing. The pre-compensated resource element value is supplied as one of a plurality of values to be transmitted. An IFFT is performed on the plurality of values to be transmitted to obtain pre-compensated initial signal information. A cyclic prefix is appended to the pre-compensated initial signal information to form an OFDM symbol for transmission from the non-reference transceiver to the UE.

16 Claims, 6 Drawing Sheets

OPERATION OF USER EQUIPMENT WHEN CONTROL AND DATA INFORMATION ARE SUPPLIED BY DIFFERENT RADIO UNITS

BACKGROUND

The present invention relates to cellular communication systems, and more particularly to the operation of user equipment when control and data information are supplied by different radio units in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. As the mobile terminal moves from one cell to another, the network hands over responsibility for serving the mobile terminal from the presently-serving cell to the "new" cell. In this way, the user of the mobile terminal experiences continuity of service without having to reestablish a connection to the network. FIG. 1 illustrates a cellular communication system providing a system coverage area 101 by means of a plurality of cells 103.

Present-day cellular communication systems are typically based on a homogenous network, mainly consisting of large macro cells, each cell having one transmitter/radio unit that serves the entire cell. In future cellular systems, heterogeneous network architectures can be expected comprising a mix of large macro and small pico/femto cells. Furthermore, there will also be situations where a specific cell has several radio units. Such solutions make it possible to utilize advanced multiple-input-multiple-output (MIMO) technology and beam forming schemes and thereby improve the entire system spectral efficiency.

FIG. 2 shows one such example involving a serving cell 200 with a main radio unit (MRU) 201, four remote radio units (RRU-1, RRU-2, RRU-3, and RRU-4), and three terminals denoted A, B, and C, respectively. Each of the remote radio units RRU-1 . . . RRU-4 is connected to the MRU 201 by means of a respective link 203-1 . . . 203-4 (collectively referenced as "203"). In this case, the main radio unit 201 is transmitting control channels (CCH) and common reference symbols (CRS) that are used by all terminals (A-C) connected to the cell 200. The CRS:s are used for demodulation of the CCH as well as for mobility measurements. The CRS:s are also used by each terminal for fine tuning in time and frequency synchronization operations. However, dedicated reference symbols (DRS) are used for data reception on data channels (DCH). The DCH and DRS could furthermore be transmitted from different remote radio units (RRU-1 . . . RRU-4) that might be closer to the terminal. In FIG. 2, terminal C gets both the DCH and the CCH from the main radio unit 201. By contrast, terminals A and B each receive the CCH from the MRU 201 while data originates from one of the remote radio units (i.e., in this example RRU-3). The RRU:s could be distributed over the entire cell 200, thereby creating a network architecture that supports the use of advanced MIMO and beam forming schemes. Such a solution as in FIG. 2 with DRS is allowed and already introduced in the Long Term Evolution (LTE) standard denoted LTE Release 8/9.

The inventors of the subject matter described herein have recognized one or more problems presented by arrangements such as that which is depicted in FIG. 2. For example, if data and control signals originate from different radio units (e.g., CCH originating from the MRU 201 and DCH originating from one of the RRU:s), these signals can arrive with different timing at the terminal. Typically, in such an arrangement as is shown in FIG. 2, the data from any given one of the RRU:s is time compensated by a network controlling node (in LTE, denoted the eNode B) in order to compensate for the delay in the cable/link 203 between the MRU 201 and the given RRU. However the terminals are likely to move around, and depending on a given terminal's exact location (see, e.g., the different locations of terminals A and B), this strategy may not achieve exact time compensation; in fact, it is expected that a time difference of, approximately 0.5-1 microsecond between the CCH and DCH is likely. In LTE systems, which use Orthogonal Frequency Division Multiplexing (OFDM), as long as the time difference between radio paths of a given signal is smaller than the cyclic prefix (CP) (4.7 micro sec in LTE) the CP itself can mitigate the effects of time dispersion. However, in situation described above, the classical time dispersion case is not presented because it does not involve different paths of the same signal, but rather different data (CCH+CRS vs. DCH+DRS) being transmitted from the two different radio units.

As mentioned above, each terminal relies on the CRS to synchronize its own timing and frequency, and there will be approximately up to 1 microsec difference between each terminal's expected timing (i.e., based on the CRS) and the actual DCH timing. Hence, once a terminal performs a Fast Fourier Transform (FFT) on the received signal based on CRS information, a significant frequency rotation over the resource elements (i.e., a group of sub-carriers over a pre-defined period of time) in the frequency-domain is introduced in the data channel (relative to the control channel). The same holds for frequency error, but the rotation will be over a resource element in the time domain.

The accuracy in transmission frequency between the main and remote nodes should be within ±100-200 Hz, but assuming different sign on the frequency error between main node (MRU 201) and a remote node (RRU-x) there will be a significant frequency rotation in time between the CCH (which the terminal uses as frequency reference) and the DCH. The above mentioned problem will introduce noise in the channel estimation process and thereby result in degraded receiver performance.

Therefore, there is a need for methods and apparatuses that are able to detect and compensate for timing and/or frequency errors that result when a terminal receives information from two different radio units and derives its own timing/frequency synchronization from only one of them.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for generating an Orthogonal Frequency Division Multiplexing (OFDM) symbol for transmission from a non-reference transceiver to a user equipment in a mobile communication system. Generating the OFDM symbol includes ascertaining a general timing for transmission of OFDM symbols, wherein the general timing is associated with a reference transceiver. A user equipment timing relative to the general timing is ascertained, and an initial resource element value is adjusted by a pre-compensating amount to obtain a pre-compensated resource element value, wherein the pre-compensating amount is based on the user equipment timing relative to the general timing. The pre-compensated resource element value is supplied as one of a plurality of values to be transmitted. An Inverse Fast Fourier Transform (IFFT) is performed on the plurality of values to be transmitted to obtain pre-compensated initial signal information. A cyclic prefix is appended to the pre-compensated initial signal information to form an OFDM symbol for transmission from the non-reference transceiver to the user equipment.

In some embodiments, generating the OFDM symbol includes adjusting each of a plurality of initial resource element values by a respective one of a plurality of pre-compensating amounts to obtain a plurality of pre-compensated resource element values; and generating the OFDM symbol from the plurality of pre-compensated resource element values. In some of such embodiments, the plurality of pre-compensating amounts form a vector that, when used to adjust the plurality of initial resource element values, results in a complex valued de-rotation of the initial resource element values, wherein the de-rotation has a rotation rate proportional to the user equipment timing.

In some embodiments, the general timing for transmission of OFDM symbols is at least in part determined by a timing for transmission of control channel information from the reference transceiver and a distance between the reference transceiver and the non-reference transceiver. In some but not necessarily all of such embodiments, the reference transceiver is a base station, and the non-reference transceiver is a remote base station.

In some embodiments, the user equipment timing relative to the general timing is based, at least in part, on a timing advance amount determined by the reference transceiver, wherein the timing advance amount influences when the user equipment will initiate uplink transmissions.

In some embodiments, the mobile communication system complies with Long Term Evolution (LTE) standards; the reference transceiver is a base station that transmits at least one common control channel and common pilot signals; and the non-reference transceiver is a remote base station that transmits data on a data channel to respective mobile terminals.

In some embodiments, the pre-compensating amount, P(n), satisfies:

$$P1(n)=\exp(-j*2*\pi*\tau1*n/N\_fft), n=0, \ldots N\_fft-1$$

where:

n is an index representing the resource element's position relative to other resource elements being transmitted to the mobile terminal in the OFDM symbol;

τ1 is the user equipment timing relative to the general timing; and

N_fft is a number of sub-carriers at an input of the IFFT.

DETAILED DESCRIPTION

Figure 1:
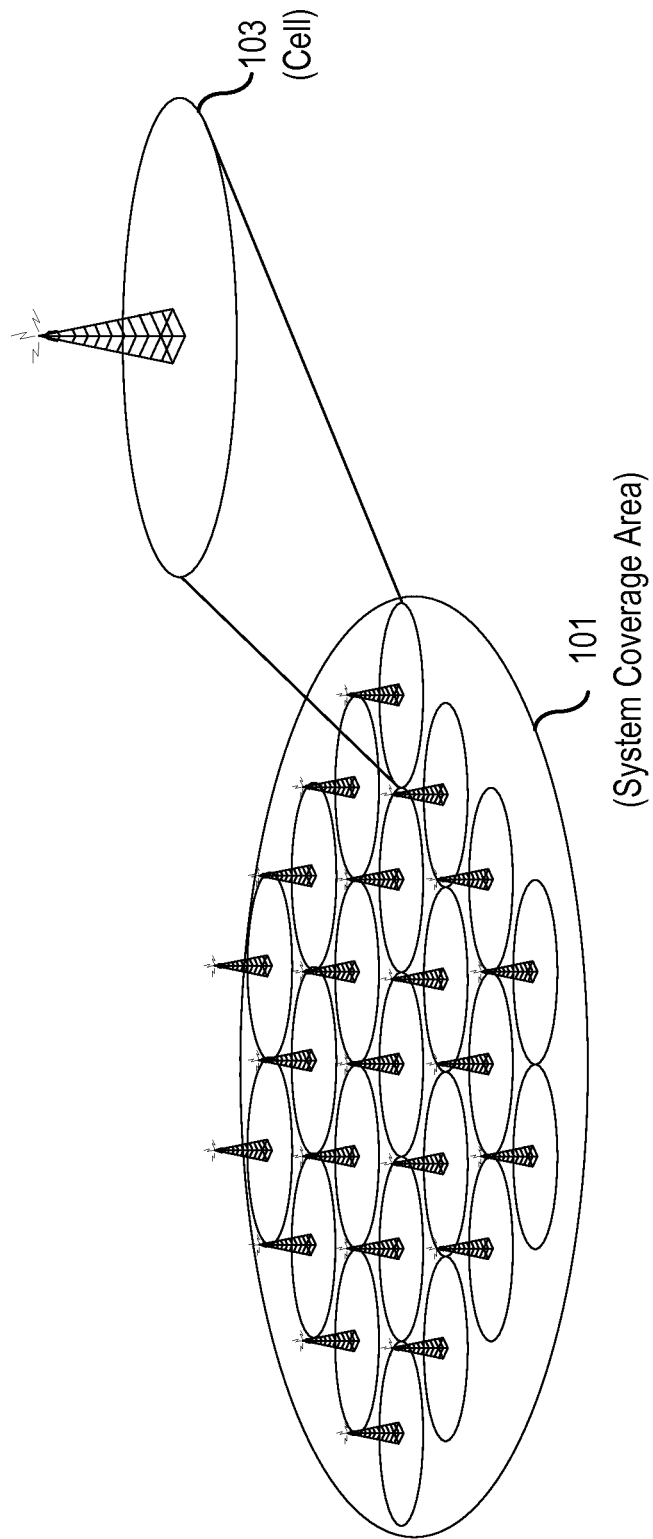
FIG. 1 illustrates a cellular communication system providing a system coverage area by means of a plurality of cells.
Figure 2:
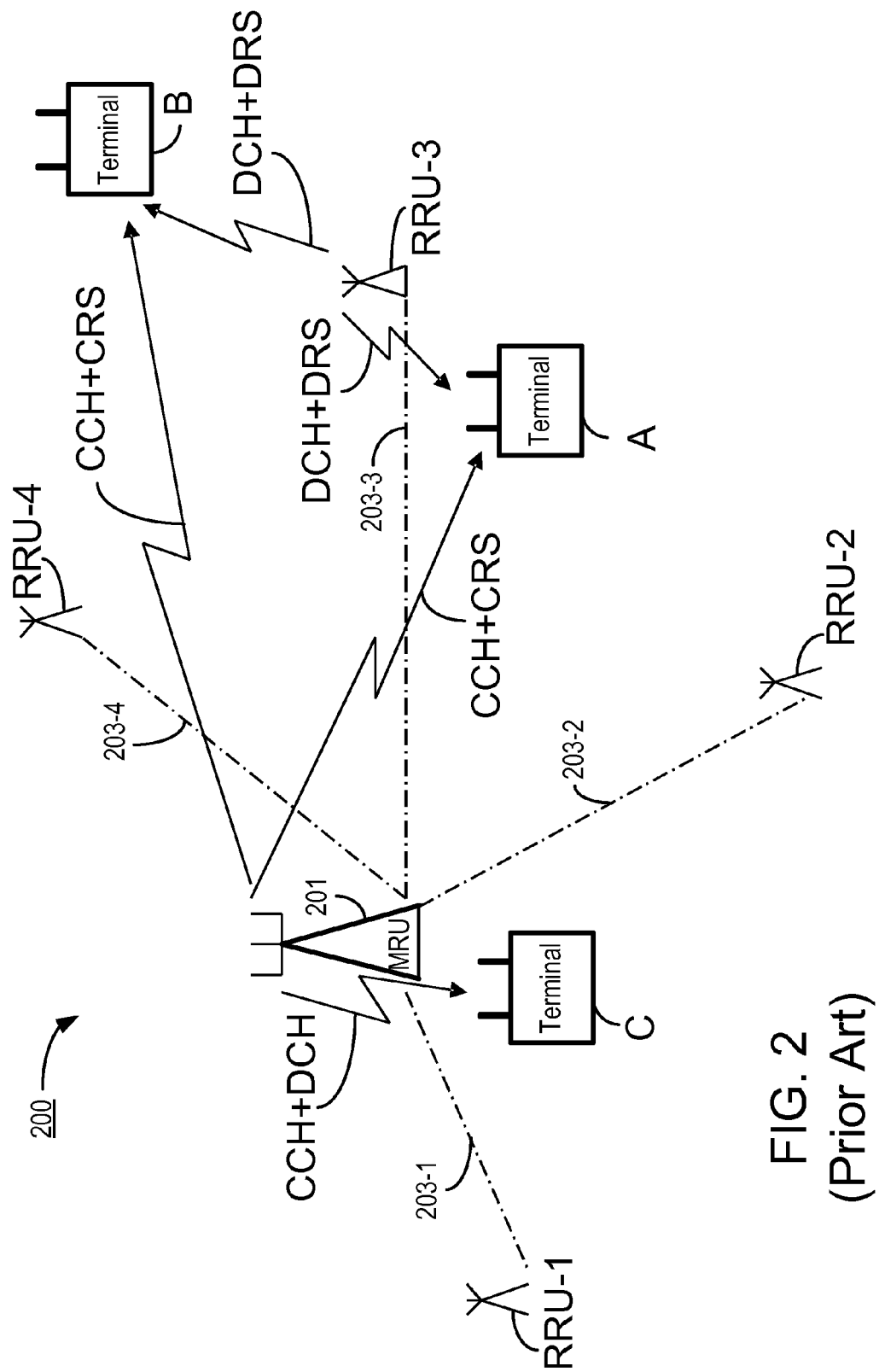
FIG. 2 illustrates a serving cell having a main radio unit connected to each of four remote radio units, and having three terminals operating in the cell.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a remote radio unit determines the timing for mobile terminals to which it is connected. The remote radio unit then determines, for each of the connected terminals, a timing offset relative to a general timing. When a resource element is to be transmitted to a given one of the connected terminals, that resource element is first pre-compensated with a pre-compensation vector that is related to the timing difference between the timing for given terminal and the general timing.

In another aspect of some embodiments consistent with the invention, the timing for a given terminal may be determined, at least in part, from the timing advance commands transmitted to the mobile terminal. In some embodiments, the timing for a given terminal may be determined, at least in part, not only from the timing advance commands, but also from information of the relative timing of reception of uplink data in relation to general uplink timing information. (As is well-known in the art, the "uplink" direction is the direction from a mobile terminal to a base station (or equivalent). The "downlink" direction is the opposite.)

In another aspect of some embodiments consistent with the invention, knowledge of distance between the remote radio unit and the main radio unit can be used to determine the timing difference. Furthermore, the pre-compensation vector applied to a resource element transmitted to a given mobile terminal may be a complex valued rotation over the resource element, the rotation being proportional to the timing offset between the given mobile terminal and the general timing.

These and other aspects are now described in further detail below. To facilitate the discussion, terminology and elements applicable to LTE systems are used. However, the invention is not limited to such embodiments, but is instead applicable in other communication systems as well.

Figure 3:
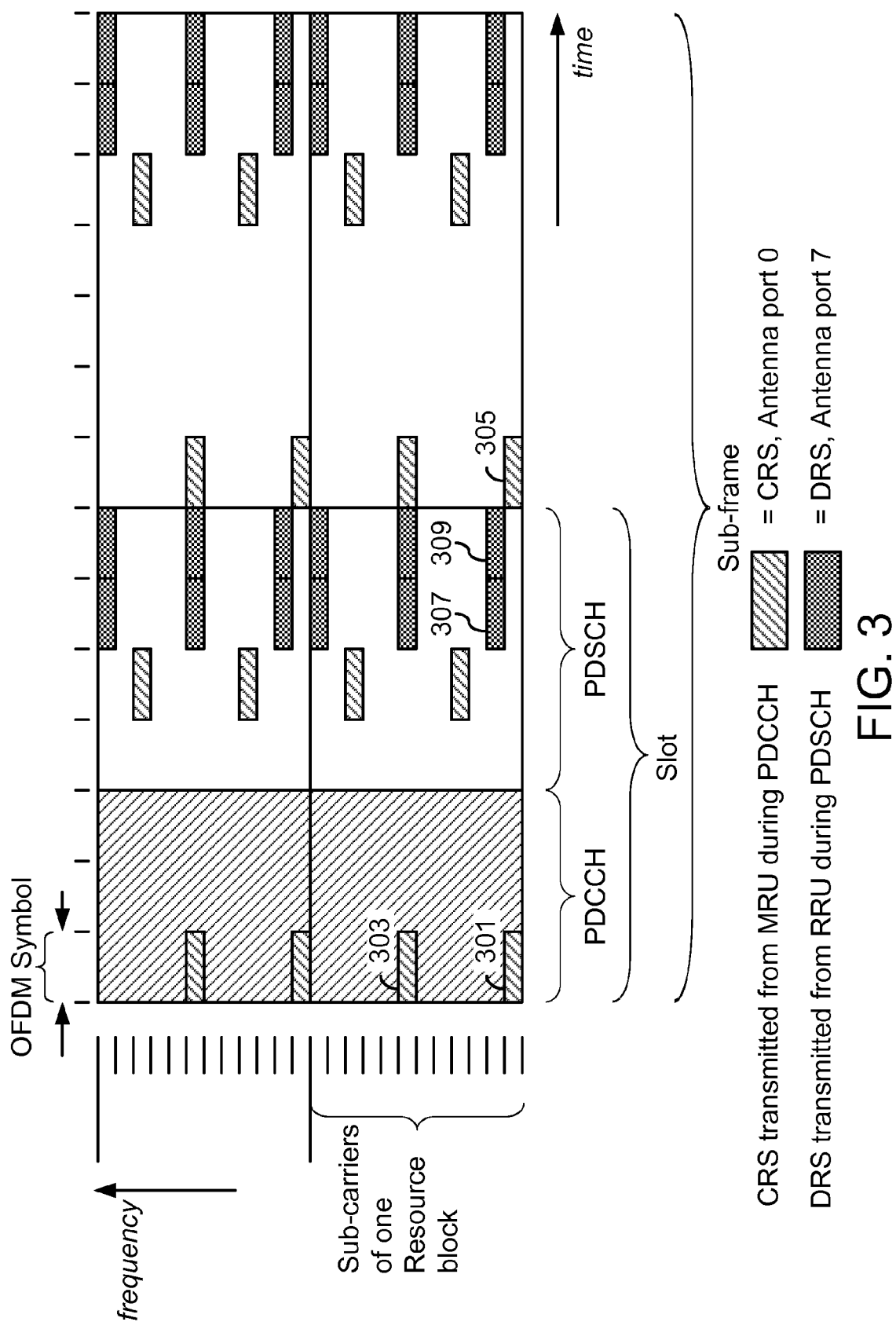
FIG. 3 illustrates an LTE slot and sub-frame structure, including common resource symbols and dedicated resource symbols transmitted from one antenna port.

FIG. 3 illustrates an LTE slot and sub-frame structure, including common resource symbols (CRS:s) and dedicated resource symbols (DRS:s) transmitted from one antenna port. Each sub-frame, lasting 1 ms, consists of two slots and a variable number of resource blocks. A resource block is defined as 12 sub-carriers taking place during one slot time. Two resource blocks are depicted in each of the two slots depicted in FIG. 3. The actual number of resource blocks allocated to a terminal will depend on the system bandwidth, which is configurable between 1.4-20 MHz. In this example, the CCH, called the Physical Dedicated Control CHannel ("PDCCH") in LTE systems, is transmitted in the first 1-3 (4 in 1.4 MHz—not shown) OFDM symbols in a subframe. More generally, the PDCCH can occupy 1, 2, or 3 symbols, with the particular number being signaled in the first OFDM symbol in a sub-frame. The PDCCH conveys information informing about where different terminals can find their data (i.e., which resource blocks) as well as which modulation and coding schemes are being used. Furthermore, to demodulate the PDCCH as well as to perform mobility measurements, common reference symbols are transmitted in OFDM symbols 0, 4, 7 and 11 on every sixth sub-carrier in each sub-frame. It is noted that only the common reference symbols from one eNode B antenna port are shown. ("Antenna port" is the term used in 3rd Generation Partnership Project—"3GPP"—systems. Usually, one (common reference) antenna port is mapped to one physical antenna.) In some instances, there could be up to 4 common reference ports (antennas). The PDCCH and common reference symbols are always transmitted from the master radio unit 201. The PDSCH as well as the dedicated reference symbols, however, could as mentioned above, be transmitted from master radio unit 203 or from a remote radio unit RRU-x. The dedicated reference symbols are transmitted on sub-carriers 1, 6, and 11 of each resource block during the last two OFDM symbols of each slot.

Figure 4B:
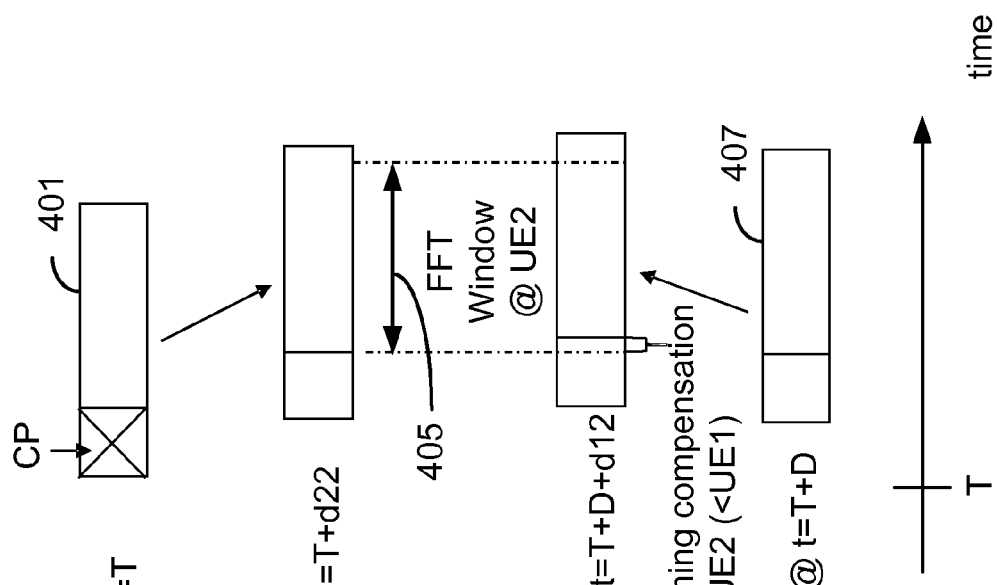
FIG. 4b shows the timing of OFDM symbols received in a second mobile terminal (UE2) from the reference transceiver and the non-reference transceiver.
Figure 4A:
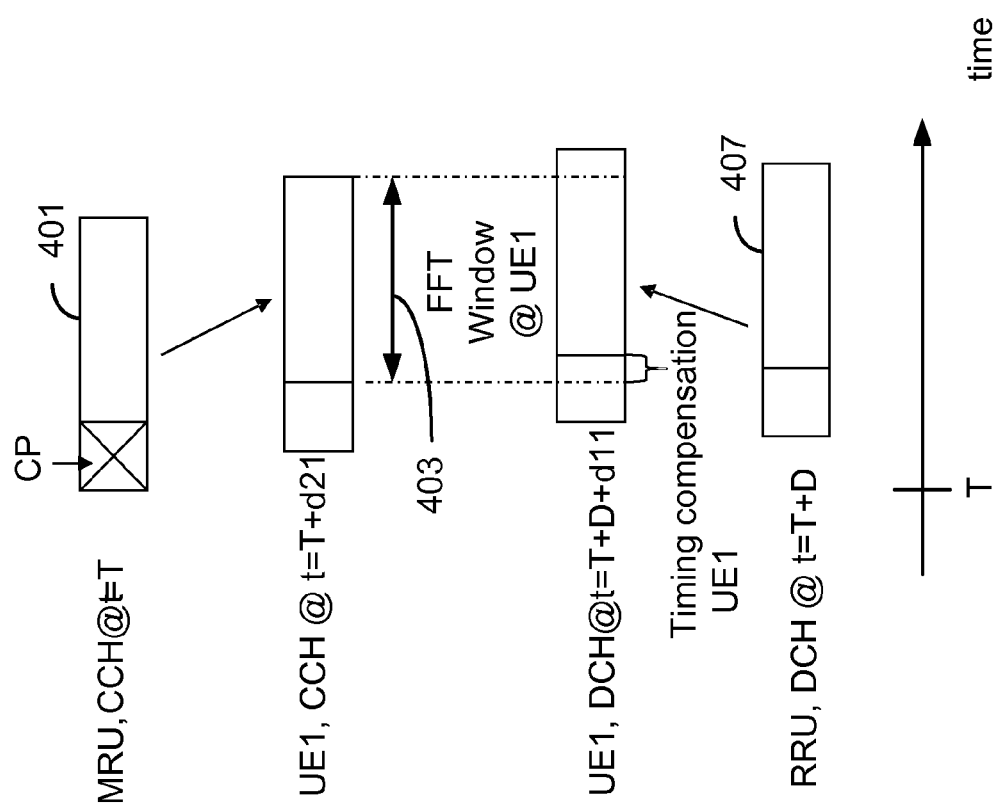
FIG. 4a shows the timing of OFDM symbols received in a first mobile terminal (UE1) from a reference transceiver and a non-reference transceiver.

FIGS. 4a and 4b are exemplary timing diagrams for two mobile terminals (UE1, UE2), respectively, that illustrate technical aspects employed in the various embodiments of the invention. In each of FIGS. 4a and 4b, at a certain moment in time T, a reference transceiver (e.g., an MRU or other transceiver that provides reference timing information to the UE:s) starts to transmit an OFDM symbol 401 including a cyclic prefix (CP). FIG. 4a shows the timing of OFDM symbols received in the first mobile terminal (UE1), whereas FIG. 4b shows the timing of OFDM symbols received in the second mobile terminal (UE2).

The OFDM symbol 401 transmitted by the reference transceiver will arrive at a time denoted T+d21 at the first mobile terminal, whereas that OFDM symbol 401 arrives at a time denoted T+d22 at the second mobile terminal. In general, d21 will not be equal to d22, due to the first and second mobile terminals being differently distanced from the reference transceiver.

The FFT windows 403, 405, for the respective terminals UE1 and UE2, are based on the common reference symbols (CRS:s) transmitted from the reference transceiver (e.g., MRU).

As mentioned earlier, when data is to be transmitted from a transceiver other than the reference transceiver (referred to herein as a "non-reference transceiver"), such as from a remote radio unit (RRU) instead of from a main radio unit (MRU), there is a delay, D, related to the communications time delay between the reference transceiver (MRU) and the other transceiver. Therefore, in each of the examples illustrated by FIGS. 4a and 4b, the other transceiver (RRU) transmits, at time instant t=T+D, an OFDM symbol 407 that will arrive at a moment in time t=T+D+d11 at the first mobile terminal (UE1) and at a moment in time t=T+D+d12 at the second mobile terminal (UE2). In general, d11 is not equal to d12 because the first and second mobile terminals (i.e., UE:s) are differently distanced from the other transceiver (RRU). As can be seen from the figures, and using the fact that, for any given mobile terminal in a typical embodiment, the other transceiver (RRU) is used only as long as the distance, d1, between a mobile terminal and the other transceiver (e.g., RRU) is less than the distance, d2, between that mobile terminal and the reference transceiver, the OFDM symbol 407 from the RRU will be delayed relative to the OFDM symbol 401 from the reference transceiver (MRU). As long as the delay is within the cyclic prefix, it will not introduce inter-symbol interference, hence no noise is introduced. Furthermore, a delay in time is the same as a frequency shift in the frequency domain (after the FFT processing of the received OFDM symbol 407a,b). Hence, the time delay, once the placement of the FFT window is set, can be pre-compensated for by introducing a frequency de-rotation of the transmitted resource element, the de-rotation being related to the time delay for the respective mobile terminal (UE1, UE2). (Note that having different time delays for the first and second mobile terminals, UE1 and UE2, means that different de-rotations need to be introduced for the mobile terminals).

Figure 5:
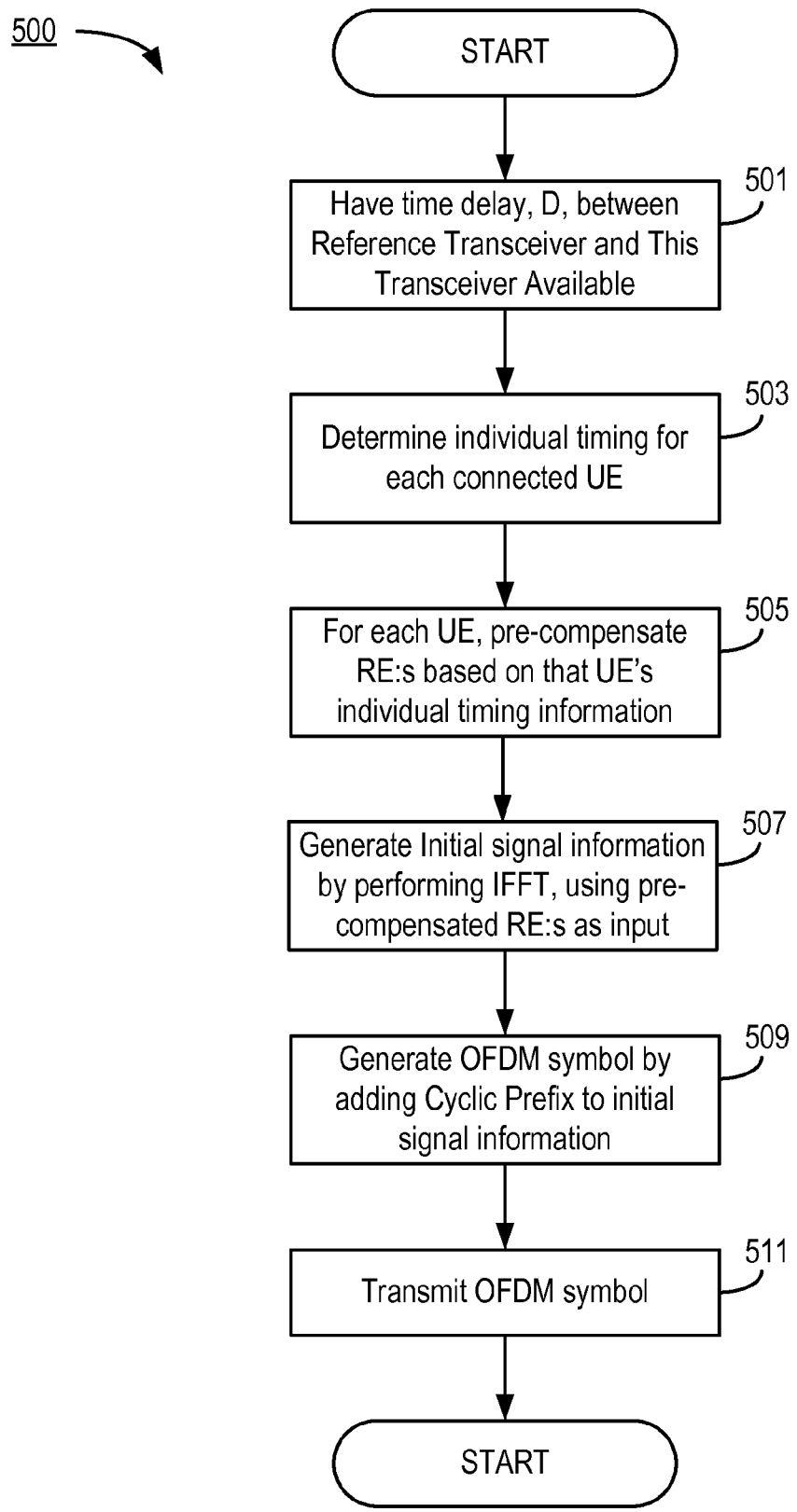
FIG. 5 is, in one respect, a flow chart of steps/processes performed by a transceiver, such as a remote radio unit (i.e., a transceiver other than a reference transceiver, MRU) in accordance with exemplary embodiments of the invention.

FIG. 5 is, in one respect, a flow chart of steps/processes performed by a transceiver, such as a remote radio unit (i.e., a transceiver other than a reference transceiver, MRU) in accordance with exemplary embodiments of the invention. In another respect, FIG. 5 can be considered to depict exemplary means 500 comprising various circuitry configured to perform the described functions. The time delay, D, between the reference transceiver and this transceiver should, at some point, be ascertained and made known to the transceiver (step 501). This is typically known by the physical distance between the reference transceiver and this receiver, and can be determined beforehand and stored for instance in a look-up table.

Then the individual timing offsets (i.e., the timing difference between the CCH/CRS reception and DCH/DRS reception) for each one of the connected terminals is ascertained (step 503). This can typically be determined by using the knowledge of CCH transmission timing (known by the processor/control units in each of the main and remote radio units, and either independently determined by each or alternatively ascertained by one and communicated to the other) and the timing advanced (TA) commands transmitted to respective mobile terminals. The remote radio unit can obtain the timing advance information in any of a number of ways. For example, the remote radio unit can be informed of this information by the main radio unit. In an alternative embodiment, the remote radio unit receives signals from the terminal and makes an independent determination of what the timing advance information would be. It is a characteristic of mobile communication systems that the separation distance between a reference transceiver (e.g., MRU) and a mobile terminal can vary over time, and at any given time will also be different from one mobile terminal to the next. Because of this difference, uplink OFDM symbols would arrive at the reference transceiver at different times if each mobile terminal always initiated its uplink transmission at the exact start of an uplink transmission window. To compensate for this, timing advance commands are worked out for each mobile terminal based on the mobile terminal's distance from the reference transceiver. The timing advance command causes each mobile terminal to transmit uplink OFDM symbols earlier than the beginning of the mobile terminal's perceived uplink timing window so that the base station will receive all OFDM symbols within its own uplink window.

Accordingly, the reference transceiver (e.g., base station) determines the timing of the uplink for respective mobile terminals in relation to a general timing and transmits a timing advance command to adjust respective terminal uplink transmission times. This knowledge can be utilized for determination of timing of downlink information as well.

Once a respective timing offset is determined for each of the terminals, a pre-compensating adjustment is made to the DCH/DRS resource elements (resource blocks) (step 505). When OFDM transmission techniques are used, the pre-compensation is applied prior to performing the Inverse Fast Fourier Transform (IFFT). The pre-compensation vector is determined based on the timing offset, and is described in further detail below in conjunction with FIG. 6.

Continuing with the exemplary embodiment in which OFDM is used, initial signal information is generated by performing an IFFT, using the pre-compensated resource elements as input (step 507). To form a complete OFDM symbol, an end portion of the initial signal information is used to form a cyclic prefix, which is then appended (i.e., attached) to the front of the initial signal information (step 509). The OFDM symbol is then transmitted (step 511). The known delay, D, between the reference transceiver and the non-reference transceiver at least in part determines when the non-reference transceiver will perform this transmission.

The technique that has just been described can be used to generate subsequent OFDM symbols for each mobile terminal. However, it is useful to monitor the respective timing offsets for each of the mobile terminals being served. Once a change in timing offset is detected, the pre-compensation vector for the affected mobile terminal is changed accordingly.

Figure 6:
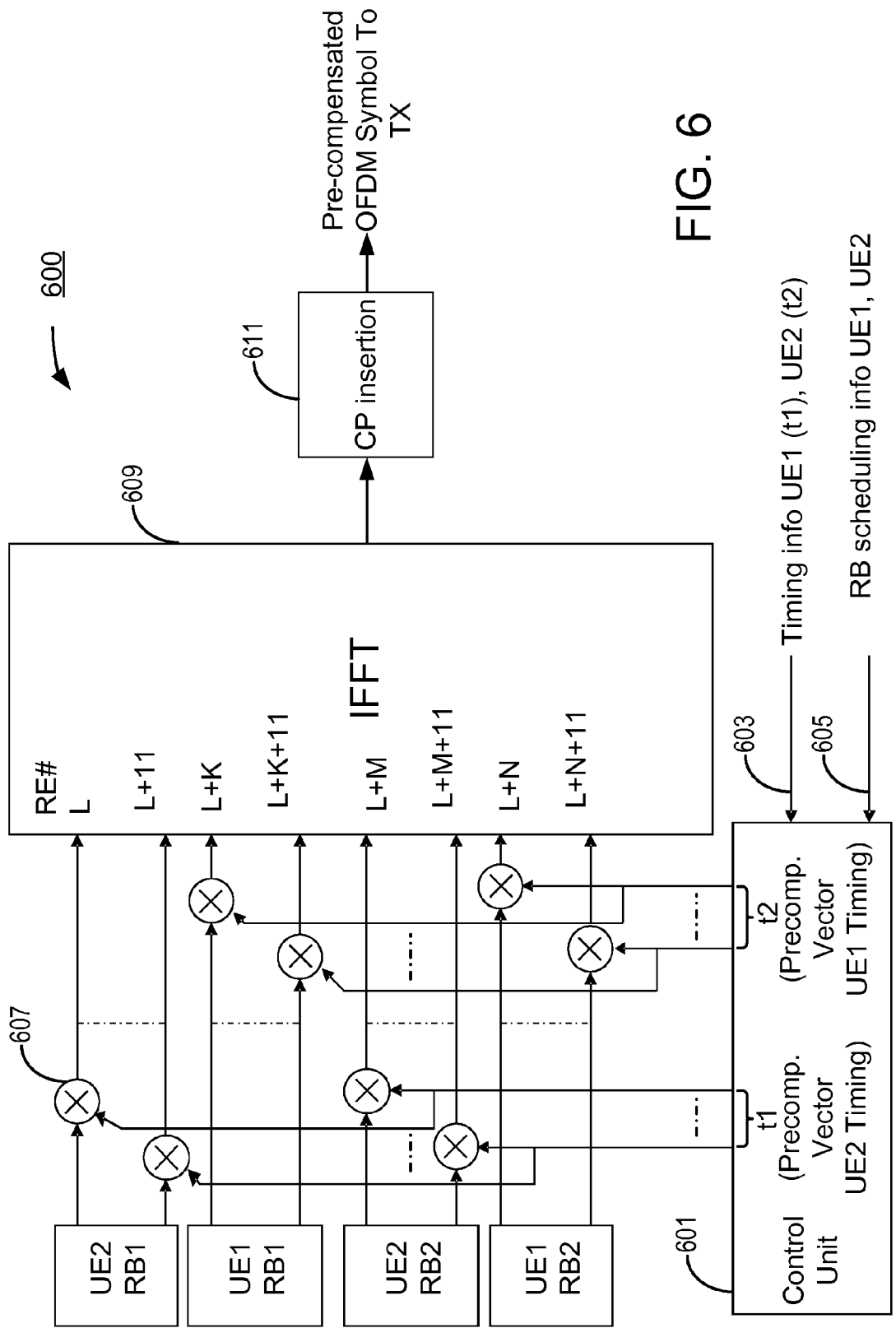
FIG. 6 is a block diagram of an exemplary transceiver unit that operates in accordance with one or more aspects of the invention.

FIG. 6 is a block diagram of an exemplary transceiver unit 600 that operates in accordance with one or more aspects of the invention. A control unit 601 receives information about general timing (e.g., resource block scheduling information for the mobile terminals being served) and respective timing offset information relative to the general timing for the connected mobile terminals (in the illustrated example, UE1 and UE2) 603. The control unit 601 then maps that information to a respective one of one or more pre-compensation vectors. Each pre-compensation vector is applied, by means of complex valued multiplication, to the resource elements (or block of 12 RE, i.e. a resource block—"RB") (QPSK/QAM symbols) of a respective one of the mobile terminals. The control unit 601 also receives information 605 about which resource blocks are associated with which mobile terminal.

Complex valued multiplication is carried out by complex multiplication circuitry, such as the complex multiplication circuitry 607. (As explained earlier, any and all "circuitry" described herein can be embodied in the form of hardwired circuit elements, one or more suitably programmed processors, and/or a combination of both.)

Respective outputs of the complex multiplication circuitry represent the pre-compensated initial resource elements, and these are applied as respective inputs to IFFT circuitry 609. The output of the IFFT circuitry 609 constitutes the initial signal information described with respect to FIG. 5. Accordingly, this is supplied to cyclic prefix insertion circuitry 611, which obtains cyclic prefix information from an end part of the initial signal information and appends this as a cyclic prefix to the initial signal information, thereby forming a pre-compensated OFDM symbol to be supplied to the transmitter.

To further facilitate an understanding of aspects of embodiments consistent with the invention, an example of pre-compensation vector generation will now be presented.

Assume that two mobile terminals, UE1 and UE2, have respective timing offsets denoted τ1 and τ2. These values can represent a number of chips, although this is not an essential aspect of the invention. These timing offsets mean that the channel, due to timing misalignment of the FFT window at the receivers, will rotate τ1*360 and τ2*360 degrees over the whole FFT output. Hence, a pre-compensation vector P1($n$) for the first mobile terminal (where "n" represents an element number) is in the form of:

$$P1(n)=\exp(-j*2*\pi*\tau 1 *n/N\_fft), n=0,\ldots N\_fft-1$$

where N_fft represents the total number of sub-carriers at the IFFT input.

A pre-compensation vector, P2($n$), is similarly determined for the second mobile terminal, using the second mobile terminal's delay, τ2, instead of the first mobile terminal's delay, τ1. Since, for any given mobile terminal, it will typically be the case that only a subset of the total number of sub-carriers, N_fft, will be allocated to that mobile terminal, it is only necessary to calculate a value of Px( ) for those values of n that correspond to resource elements that are actually allocated to mobile terminal x. For example, the resource blocks for UE1 in FIG. 6 only require that values of P1($n$) be ascertained for n=L+K, . . . L+K+11 and n=L+N, . . . L+N+11. Similarly, the resource blocks for UE2 in FIG. 6 only require that values of P2($n$) be ascertained for n=L, . . . L+11 and n=L+M, . . . L+M+11.

The pre-compensation vectors are applied to the resource elements for the respective first and second mobile terminals, UE1 UE2. It is noted that in systems, such as the exemplary LTE system referenced above, there is no requirement that any given mobile terminal's resource blocks be contiguous. Accordingly, when applying the pre-compensation vector to a mobile terminal's resource blocks, the control unit 603 ensures that resource block-size portions of the pre-compensation vector for a given mobile terminal are applied to respective resource blocks that are actually associated with that mobile terminal. For example, in the illustration depicted in FIG. 6, and assuming that only two resource blocks are allocated to the first mobile terminal (UE1), the pre-compensation vector elements are applied to respective resource elements L+K through L+K+11 (i.e., the resource elements of UE1's first resource block) and to respective elements L+N to L+N+11 (i.e., the resource elements of UE1's second resource block). A similar mapping must be made when applying the second mobile terminals' pre-compensation vector to the second mobile terminal's allocated resource elements.

The above-described embodiments have been described in terms of techniques and apparatuses for enabling remote radio unit transmissions to achieve time aligned reception in a remote device with reception of a main radio unit transmission. However, the invention is not limited to such embodiments. To present just one example of many possible alternative embodiments, the use of pre-compensation of resource elements prior to performing an IFFT, where the pre-compensation is based on a detected timing offset, can also be applied to mobile terminal transmission, where a pre-compensation of resource elements is applied instead of changing the transmission time.

At least some of the above-described embodiments provide advantages over prior methodology in that, with the described solution, the reception of reference transmitter information (e.g., CCH/CRS in an LTE system) and other transmitter information (e.g., an RRU's transmission of DCH/DRS in an LTE system) appears to be time aligned at the mobile terminal. The cost is that the total delay spread that can be handled without the introduction of inter-symbol interference (ISI) is reduced. However, the delay spread in heterogeneous deployment is typically much smaller than the cyclic prefix. Hence, the cost is tolerable and, in the end, a more robust receiver performance is achieved.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating an Orthogonal Frequency Division Multiplexing (OFDM) symbol for transmission from a non-reference transceiver to a user equipment in a mobile communication system, the method comprising:
    ascertaining a general timing for transmission of OFDM symbols, wherein the general timing is associated with a reference transceiver;
    ascertaining a user equipment timing relative to the general timing;
    adjusting an initial resource element value by a pre-compensating amount to obtain a pre-compensated resource element value, wherein the pre-compensating amount is based on the user equipment timing relative to the general timing;
    supplying the pre-compensated resource element value as one of a plurality of values to be transmitted;
    performing an Inverse Fast Fourier Transform (IFFT) on the plurality of values to be transmitted to obtain pre-compensated initial signal information; and
    appending a cyclic prefix to the pre-compensated initial signal information to form an OFDM symbol for transmission from the non-reference transceiver to the user equipment.

2. The method of claim 1, comprising:
    adjusting each of a plurality of initial resource element values by a respective one of a plurality of pre-compensating amounts to obtain a plurality of pre-compensated resource element values; and
    generating the OFDM symbol from the plurality of pre-compensated resource element values.

3. The method of claim 2, wherein the plurality of pre-compensating amounts form a vector that, when used to adjust the plurality of initial resource element values, results in a complex valued de-rotation of the initial resource element values, wherein the de-rotation has a rotation rate proportional to the user equipment timing.

4. The method of claim 1, wherein the general timing for transmission of OFDM symbols is at least in part determined by a timing for transmission of control channel information from the reference transceiver and a distance between the reference transceiver and the non-reference transceiver.

5. The method of claim 4, wherein the reference transceiver is a base station, and the non-reference transceiver is a remote base station.

6. The method of claim 1, wherein the user equipment timing relative to the general timing is based, at least in part, on a timing advance amount determined by the reference transceiver, wherein the timing advance amount influences when the user equipment will initiate uplink transmissions.

7. The method of claim 1, wherein:
    the mobile communication system complies with Long Term Evolution (LTE) standards;
    the reference transceiver is a base station that transmits at least one common control channel and common pilot signals; and
    the non-reference transceiver is a remote base station that transmits data on a data channel to respective mobile terminals.

8. The method of claim 1, wherein the pre-compensating amount, P(n), satisfies:

$$P(n)=\exp(-j*2*\pi*\tau 1*n/N\_\mathit{fft}), n=0,\ldots N\_\mathit{fft}-1$$

where:
    n is an index representing the resource element's position relative to other resource elements being transmitted to the mobile terminal in the OFDM symbol;
    τ1 is the user equipment timing relative to the general timing; and
    N_fft is a total number of sub-carriers supplied as input values to the IFFT.

9. An apparatus for generating an Orthogonal Frequency Division Multiplexing (OFDM) symbol for transmission from a non-reference transceiver to a user equipment in a mobile communication system, the apparatus comprising:
    circuitry configured to ascertain a general timing for transmission of OFDM symbols, wherein the general timing is associated with a reference transceiver;
    circuitry configured to ascertain a user equipment timing relative to the general timing;
    circuitry configured to adjust an initial resource element value by a pre-compensating amount to obtain a pre-compensated resource element value, wherein the pre-compensating amount is based on the user equipment timing relative to the general timing;
    circuitry configured to supply the pre-compensated resource element value as one of a plurality of values to be transmitted;
    circuitry configured to perform an Inverse Fast Fourier Transform (IFFT) on the plurality of values to be transmitted to obtain pre-compensated initial signal information; and
    circuitry configured to append a cyclic prefix to the pre-compensated initial signal information to form an OFDM symbol for transmission from the non-reference transceiver to the user equipment.

10. The apparatus of claim 9, wherein the apparatus generates the OFDM symbol from a plurality of initial resource element values, and wherein the apparatus is configured to adjust each of the initial resource element values by a respective one of a plurality of pre-compensating amounts to obtain a plurality of pre-compensated resource element values.

11. The apparatus of claim 10, wherein the plurality of pre-compensating amounts form a vector that, when used to adjust the plurality of initial resource element values, results in a complex valued de-rotation of the initial resource element values, wherein the de-rotation has a rotation rate proportional to the user equipment timing.

12. The apparatus of claim 9, comprising:
circuitry configured to determine the general timing for transmission of OFDM symbols at least in part by a timing for transmission of control channel information from the reference transceiver and a distance between the reference transceiver and the non-reference transceiver.

13. The apparatus of claim 12, wherein the reference transceiver is a base station, and the non-reference transceiver is a remote base station.

14. The apparatus of claim 9, comprising:
circuitry configured to ascertain the user equipment timing relative to the general timing based, at least in part, on a timing advance amount determined by the reference transceiver, wherein the timing advance amount influences when the user equipment will initiate uplink transmissions.

15. The apparatus of claim 9, wherein:
the mobile communication system complies with Long Term Evolution (LTE) standards;
the reference transceiver is a base station that transmits at least one common control channel and common pilot signals; and
the non-reference transceiver is a remote base station that transmits data on a data channel to respective mobile terminals.

16. The apparatus of claim 9, wherein the pre-compensating amount, P(n), satisfies:

$$P(n)=\exp(-j*2*\pi*\tau 1*n/N\_fft), n=0,\ldots N\_fft-1$$

where:
n is an index representing the resource element's position relative to other resource elements being transmitted to the mobile terminal in the OFDM symbol;
$\tau 1$ is the user equipment timing relative to the general timing; and
N_fft is a total number of sub-carriers supplied as input values to the IFFT.

* * * * *